US010967285B2

(12) United States Patent
Rodriguez et al.

(10) Patent No.: US 10,967,285 B2
(45) Date of Patent: Apr. 6, 2021

(54) AMUSEMENT PARK RIDE VIBRATION SYSTEM

(71) Applicant: Universal City Studios LLC, Universal City, CA (US)

(72) Inventors: William Rodriguez, Orlando, FL (US); Rachel Wilcox, Orlando, FL (US); Garrett Malatek, Orlando, FL (US); Luis Carlos Alarcon, Orlando, FL (US); Kevin Primm, Orlando, FL (US)

(73) Assignee: Universal Studios LLC, Universal City, CA (US)

( * ) Notice: Subject to any disclaimer, the term of this patent is extended or adjusted under 35 U.S.C. 154(b) by 0 days.

(21) Appl. No.: 16/438,216

(22) Filed: Jun. 11, 2019

(65) Prior Publication Data
US 2020/0188801 A1 Jun. 18, 2020

Related U.S. Application Data

(60) Provisional application No. 62/779,347, filed on Dec. 13, 2018.

(51) Int. Cl.
*A63G 31/02* (2006.01)
*A63B 69/00* (2006.01)

(52) U.S. Cl.
CPC .................................... *A63G 31/02* (2013.01)

(58) Field of Classification Search
CPC ........ A63G 31/00; A63G 31/02; A63B 69/00; A63B 69/04; A63B 26/003; A63B 2244/24
USPC ........ 472/43, 59, 60, 95, 130, 135; 434/247; 482/51
See application file for complete search history.

(56) References Cited

U.S. PATENT DOCUMENTS

| 3,865,430 A | 2/1975 | Tanus | |
|---|---|---|---|
| 2008/0146357 A1* | 6/2008 | Hsu | A61H 1/001 472/59 |
| 2011/0276156 A1 | 11/2011 | Thweny et al. | |
| 2015/0210238 A1* | 7/2015 | Biegun | A63G 7/00 297/487 |
| 2018/0104601 A1 | 4/2018 | Wagner | |
| 2019/0118760 A1* | 4/2019 | Hall | B60R 22/14 |

FOREIGN PATENT DOCUMENTS

GB 2317836 B 4/1998

OTHER PUBLICATIONS

Parisi, "Shocking Grasps: An Archaeology of Electrotactile Game Mechanics", Nov. 20, 2018.
Pictures, Nov. 20, 2018.
PCT/US2019/065285 Invitation to Pay Additional Fees dated Mar. 12, 2020.

* cited by examiner

*Primary Examiner* — Kien T Nguyen
(74) *Attorney, Agent, or Firm* — Fletcher Yoder P.C.

(57) ABSTRACT

A ride vibration system includes a rider support feature coupled to a ride vehicle and accessible to a rider positioned in the ride vehicle. The system includes a vibrator with a motor that rotates an eccentric mass to generate vibrations. The vibrator is at least partially integrated with the rider support feature and transfers the vibrations to the rider support feature. An input device receives a vibration intensity selection. A controller couples to the vibrator and to the input device. The controller receives the vibration intensity selection and controls the motor to control an intensity of the vibrations.

20 Claims, 7 Drawing Sheets

AMUSEMENT PARK RIDE VIBRATION SYSTEM

CROSS-REFERENCE TO RELATED APPLICATIONS

This application claims priority from and the benefit of U.S. Provisional Application Ser. No. 62/779,347, entitled "AMUSEMENT PARK RIDE VIBRATION SYSTEM," filed Dec. 13, 2018, which is hereby incorporated by reference in its entirety.

BACKGROUND

The present disclosure relates generally to amusement park rides.

Many amusement park-style rides include ride vehicles that carry passengers along a ride path, such as a track. As the ride vehicle travels along the ride path, the ride vehicle may be subjected to a variety of ride path features, such as turns, loops, twists, and so forth, that are part of the ride path.

It is common for ride vehicles and amusement park-style attractions to include other features that enhance the ride vehicle experience for passengers. For example, ride vehicles, ride paths, and/or other elements of the ride system may include lights, speakers, interactive elements, specialized environments, and/or other features that provide sensory stimulation for the passenger in the ride vehicle to enhance the ride experience. It will be appreciated that passengers enjoying the ride vehicle experience may desire different levels of sensory stimulation.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

SUMMARY

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, a ride vibration system includes a rider support feature coupled to a ride vehicle and accessible to a rider positioned in the ride vehicle. The system includes a vibrator with a motor that rotates an eccentric mass to generate vibrations. The vibrator is at least partially integrated with the rider support feature and transfers the vibrations to the rider support feature. An input device receives a vibration intensity selection. A controller couples to the vibrator and to the input device. The controller receives the vibration intensity selection and controls the motor to control an intensity of the vibrations.

In accordance with an embodiment, a ride vibration system includes a restraint system that restrains a rider in a seat and a vibrator that generates vibrations. An input device receives a vibration intensity selection for the ride vibration system. A controller couples the vibrator to the input device. The controller receives the vibration intensity selection and controls an intensity of the vibrations.

In accordance with an embodiment, a high-frequency vibrator includes a shaft. An eccentric mass couples to the shaft. The eccentric mass vibrates the shaft in response to rotation of the shaft. A vibrator housing receives the shaft and the eccentric mass. The vibrator housing couples to a ride vehicle. A bearing couples to the shaft. The bearing transfers shaft vibrations to the vibrator housing. A motor couples to the shaft and rotates the shaft. An input device couples to the motor. The input device changes a rotational speed of the motor to control vibration of the vibrator.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Reference will now be made in detail to specific embodiments illustrated in the accompanying drawings and figures. In the following detailed description, numerous specific details are set forth in order to provide a thorough understanding of the disclosure. However, it will be apparent to one of ordinary skill in the art that embodiments may be practiced without these specific details. In other instances, well-known methods, procedures, and components, have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "has," "having," "includes," "including," "comprises" and/or "comprising," when used in this specification, are inclusive terms that specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

Amusement parks include many rides that provide unique and entertaining experiences for riders. Amusement parks typically include a wide variety of rides to accommodate the thrill sensitivities and immersive experience desires of different visitors. Accordingly, these rides are designed around a hypothetical riders, such as children, teenagers, adults, and/or senior citizens. For example, the amount of twist, rotation, acceleration, deceleration, height of ride, special effects, etc. are designed with a hypothetical rider in mind. The rides may also be designed to include special effects to create a more immersive experience such as incorporating fog, water, and vibration. Unfortunately, what may be thrilling to a child may not be for a teenager or adult. In accordance with present embodiments, the same ride may include adjustable special effects or adjustable sensations to accommodate different riders. By including adjustable special effects, two different riders may have an equally satisfying experience on the same ride. For example, differently aged siblings or parents and their children may share a ride and receive a ride tailored to their personal preferences. The ride vibration system discussed in detail below may increase the immersive experience of a ride by simulating vibrations from gun recoil, vehicle movement, explosions, electrical shock, among others. Furthermore, the amount and/or intensity of the vibrations produced by the vibration system may be tailored to the rider.

Figure 1:
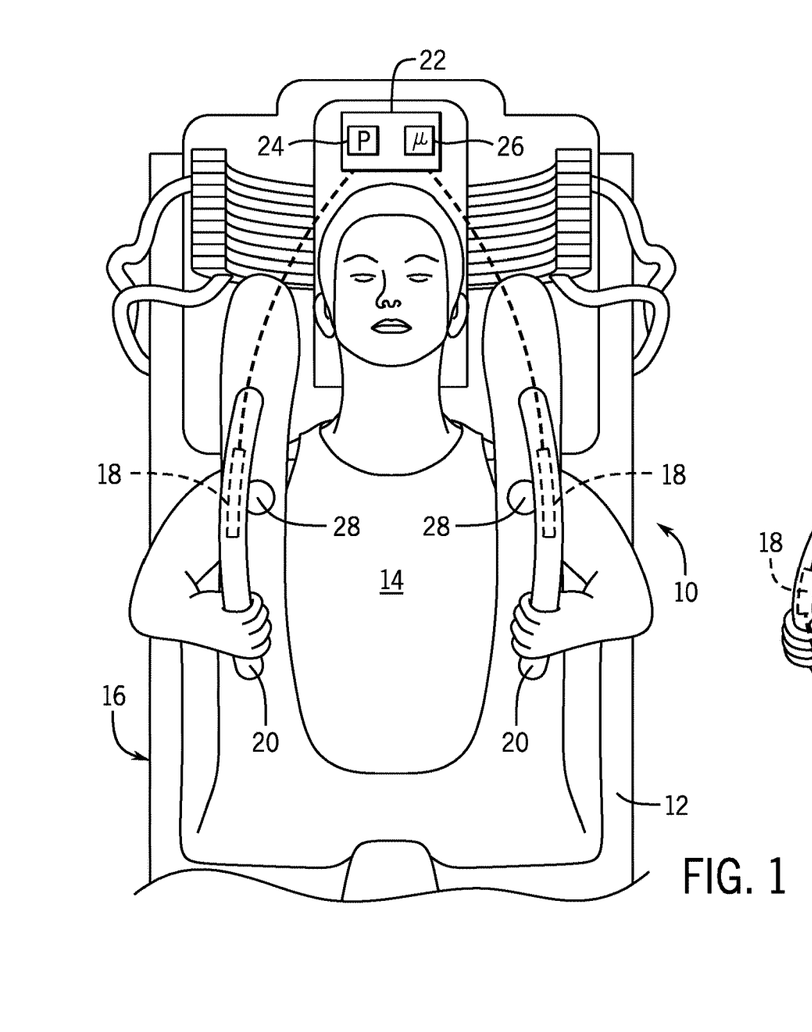
FIG. 1 is a front view of a ride vibration system, in accordance with an embodiment of the present disclosure.
Figure 2:
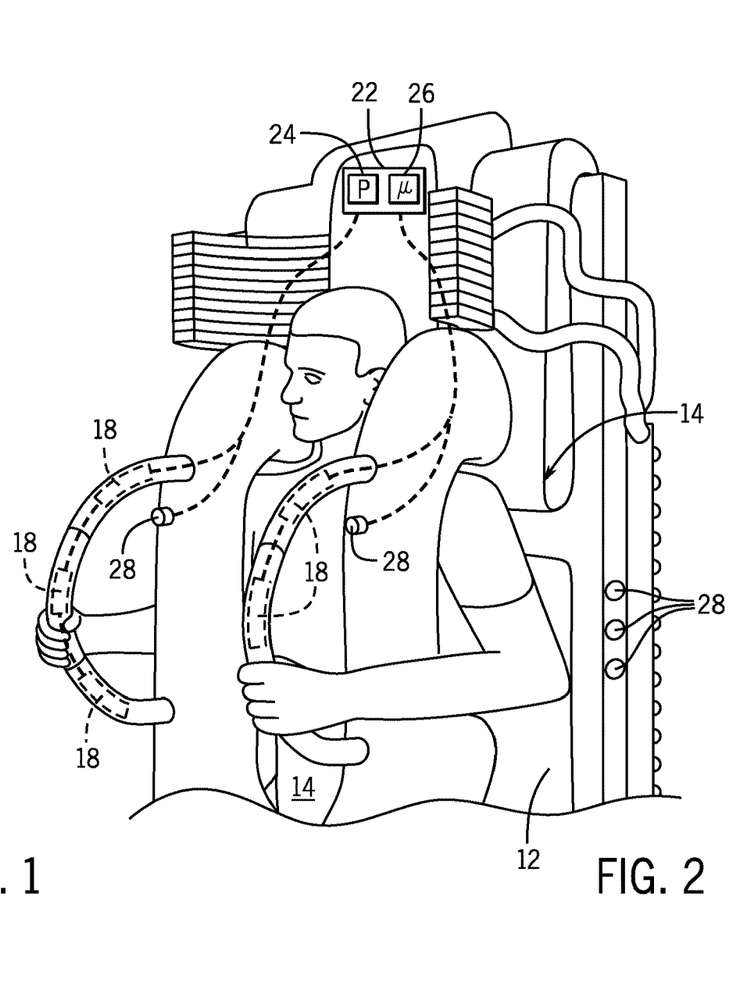
FIG. 2 is a perspective view of a ride vibration system, in accordance with an embodiment of the present disclosure.

FIGS. 1 and 2 respectively illustrate a front view and a perspective view of a ride vibration system 10 in accordance with present embodiments. The ride vibration system 10 may include a seat 12 that receives a rider 14 and a restraint system 16 that holds the rider 14 in the seat 12 during the ride. During the ride various images and scenes may flash and/or pass by the rider 14. The rider 14 may associate these images and scenes with vibration, electrical shock, among others. To enhance the experience and/or make it more lifelike, the ride vibration system 10 includes one or more vibrators 18 that generate vibrations at specific times during the ride. For example, if the scene involves the firing of a potato gun, the vibrators 18 may generate vibrations so that the rider 14 senses a motion associated with the rapid recoil of the gun. In another example, the scene may involve electricity, and the vibrators 18 may generate high-frequency vibrations that may fool the rider 14 into believing they are being electrically shocked.

As illustrated, the vibrators 18 may be placed within restraint handles 20 of the restraint system 16. These restraint handles 20 may be grabbed by the rider 14 during the ride enabling vibrations generated by the vibrators 18 to be transferred through the handles 20 and into the hands and body of the rider 14. The amount of vibration produced by the vibrator 18 is controlled with a controller 22. The controller 22 communicatively couples to the vibrator 18 (e.g., wired connection, wireless connection). The controller 22 includes a processor 24 and a memory 26. For example, the processor 24 may be a microprocessor that executes software to control motors (e.g., high frequency motors, stepper motors) to generate vibrations in response to the location, time, current scene/image of the ride, or a combination thereof. The processor 24 may include multiple microprocessors, one or more "general-purpose" microprocessors, one or more special-purpose microprocessors, and/or one or more application specific integrated circuits (ASICs), field-programmable gate arrays (FPGAs), or some combination thereof. For example, the processor 24 may include one or more reduced instruction set computer (RISC) processors.

The memory 26 may include a volatile memory, such as random access memory (RAM), and/or a nonvolatile memory, such as read-only memory (ROM). The memory 26 may store a variety of information and may be used for various purposes. For example, the memory 26 may store processor executable instructions, such as firmware or software, for the processor 24 to execute. The memory 26 may include ROM, flash memory, a hard drive, or any other suitable optical, magnetic, or solid-state storage medium, or a combination thereof. The memory 26 may store data, instructions, and any other suitable data. In operation, the processor 24 executes instructions on the memory 26 to control the vibrators 18.

In some embodiments, the controller 22 may control the vibrators 18 in response to feedback from the rider 14 and/or a ride operator. For example, the ride vibration system 10 may include one or more input devices (e.g., buttons and/or dials 28, touch sensitive handles) that enable the rider 14 to adjust the intensity of the vibrations generated by the vibrator 18. These buttons and/or dials 28 may be placed on the restraint system 16, on the handles 20, and/or on the seat 12 enabling a rider 14 to easily access and change the vibrational intensity. In some embodiments, buttons or dials 28 may be placed out of reach of the rider 14 while on the ride. The vibrational intensity may therefore be adjusted before the ride by the rider 14 and/or the ride operator. For example, the ride operator may ask the rider 14 what their desired ride intensity level is. The ride operator may then adjust the dial and/or push the button(s) 28 in response to the feedback from the rider 14. In some embodiments, the rider 14, prior to getting onto the ride, may be provided information regarding increasing or decreasing the intensity of the ride (e.g., during an informational video). The rider 14 may then adjust the dial(s) and/or button(s) 28 prior to being restrained. Once restrained, the rider 14 may no longer be able to access the button(s) and/or dial(s) 28 or they may be deactivated.

The input device(s) may enable a variety of control of the vibrators 18. For example, a dial 28 may enable an analog like input to the controller 22 regarding the desired vibrational intensity. That is, the vibrational intensity may be varied to multiple levels between no vibration and a maximum vibration of the vibrators 18. Buttons 28 may similarly control the amount of vibrational feedback. For example, a button 28 may turn the vibrator 18 completely on or completely off. In some embodiments, depressing the button 28 repeatedly may change the vibrational intensity level. In still other embodiments, the ride vibration system 10 may include multiple buttons 28 (e.g., color coded buttons) with each one associated with a specific vibrational intensity (e.g., low, medium, high).

As illustrated in FIGS. 1 and 2, the ride vibration system 10 may include two buttons or dials 28 (e.g., input devices) placed on the restraint system 16 over the shoulders. These buttons or dials 28 may individually control the respective vibrators 18 in the proximately located handles 20 or elsewhere on the seat 12 or restraint system 16. For example, one button 28 may control vibrators 18 in the handles 20 or just one of the handles 20 and the other button 28 may control vibrators 18 in the seat 12 and/or in the other handle 20. The buttons or dials 28 may also control all of the vibrators 18. For example, adjusting one of the buttons or dials 28 may adjust the intensity of all of the vibrators 18. In some embodiments, the buttons 28 may control different vibrational special effects. For example, one of the buttons 28 may control the intensity of all of the vibrators 18 for simulating vehicle vibration, recoil vibration, etc. and the other button 28 may control the intensity of vibrations that simulate electrical shock.

In some embodiments, the ride vibration system 10 may include an input device(s) that senses the touch of the rider 14 on the handles 20 with one or more sensors (e.g., touch-sensitive sensors). These sensors couple to the controller 22. The controller 22, in response to a signal from the sensor, activates the vibrators 18. In some embodiments, depending on where the rider 14 grips the handle 20 the controller 22 may adjust the intensity of the vibrations. For example, each handle 20 may be divided into sections (e.g., 1, 2, 3, or more sections). These sections may be color coded, include written messages, and/or include a physical divider (e.g., bands, circumferential lip). In one embodiment, the sections may be color coded red, yellow, and green to indicate the vibrational intensity available to the rider 14. In operation, the rider 14 may grab the section on the handle 20 that correlates to the desired level of vibration. The sensors (e.g., touch-sensitive sensors) detect the location of the rider's hands on the handles 20 and in response drives one or more vibrators 18 to create the desired vibrational intensity. For example, each handle 20 may include a vibrator 18 for each section. The controller 22 may therefore drive the vibrator 18 associated with that section. In some embodiments, instead of driving individual vibrators 18 differently, the controller 22 may adjust all of the vibrators 18 to match the desired intensity. For example, each handle 20 may include one or more vibrators 18 that are driven at the same intensity level depending on which section of the handle 20 the rider 14 grabs.

Figure 3:
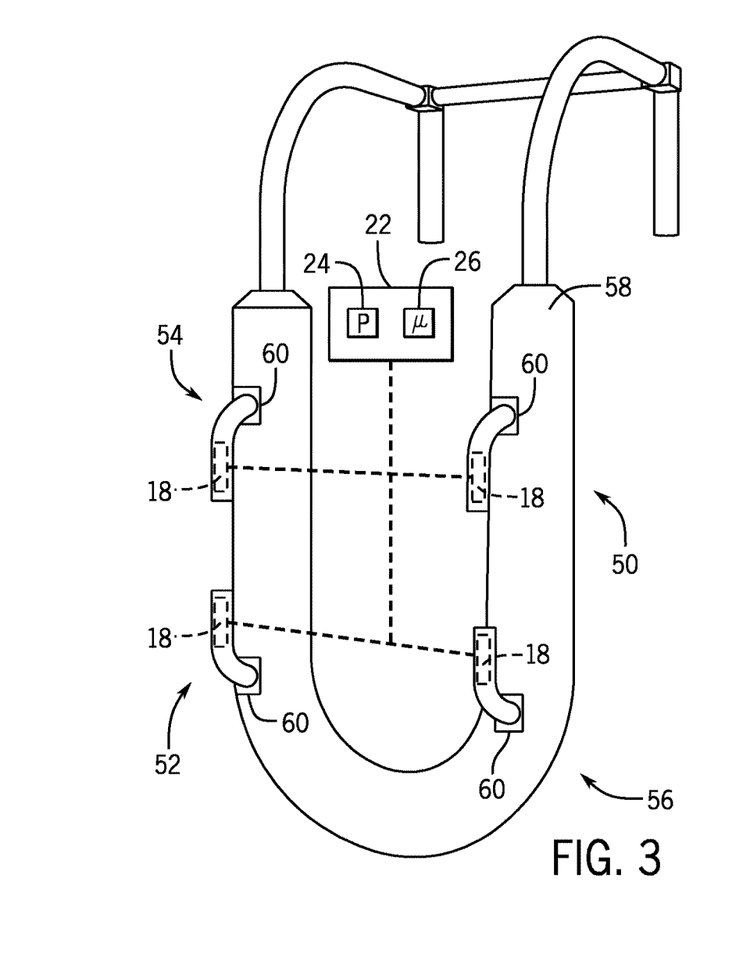
FIG. 3 is a perspective view of a ride vibration system, in accordance with an embodiment of the present disclosure.
Figure 4:
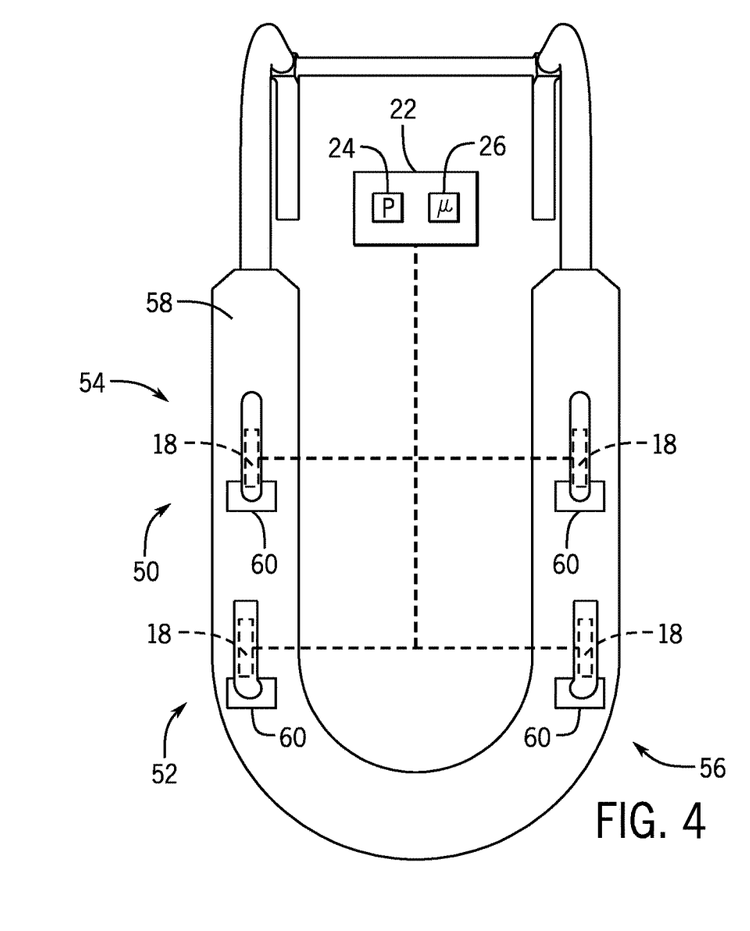
FIG. 4 is a front view of a ride vibration system, in accordance with an embodiment of the present disclosure.

FIGS. 3 and 4 respectively illustrate a perspective view and a front view of a ride vibration system 50 in accordance with present embodiments. As illustrated, the ride vibration system 50 includes a restraint system 52 that holds a rider in the seat 12. As explained above, to enhance the experience and/or make it more lifelike, the ride vibration system 50 includes one or more vibrators 18 that generate vibrations at desired times during the ride. For example, the vibrators 18 may generate vibrations that transfer to the rider and simulate vehicle vibration, shock via electricity, recoil, among others. The vibrators 18 may be placed within upper and lower restraint handles 54 and 56 of the restraint system 52. These restraint handles 54, 56 may be grabbed by the rider 14 during the ride, thereby enabling the vibrations generated by the vibrators 18 to be transferred through the restraint handles 54, 56 and into the hands and body of the rider 14. The vibrator 18 is controlled with the controller 22, which controls motors (e.g., high frequency motors, stepper motors) to generate vibrations. The controller 22 communicatively couples to the vibrator 18 (e.g., wired connection, wireless connection).

In some embodiments, the controller 22 may control the vibrators 18 in response to feedback from the rider 14. For example, the controller 22 may provide a different vibratory experience depending on if the upper or lower restraint handles 54, 56 are grabbed. In some embodiments, the controller 22 may detect, with a sensor, if the upper restraint handles 54 are being used and provide a more intense vibratory sensation. Similarly, the controller 22 may detect, with a sensor, if the lower restraint handles 54 are being used and provide a less intense vibratory experience, or in some embodiments no vibration. This arrangement may be reversed with the vibrators 18 in the upper restraint handles 54 providing less intense vibrations than the vibrators 18 in the lower restraint handles 56. In some embodiments, instead of detecting which restraint handles 54, 56 are being used, the controller 22 may always turn on all of the vibrators 18 at the desired time and for a desired time period. However, each restrain handle 54, 56 is insulated or separated such that transfer of vibrations from one to the other is blocked or resisted. The rider then determines the ride experience depending on which restraint handles 54, 56 are grabbed. In order to block the transmission of vibration into the restraint 58, the ride vibration system 50 may include dampers 60 between the restraint handles 54, 56 to block and/or reduce the transmission of vibration into the restraint 58 and/or seat 12.

Figure 5:
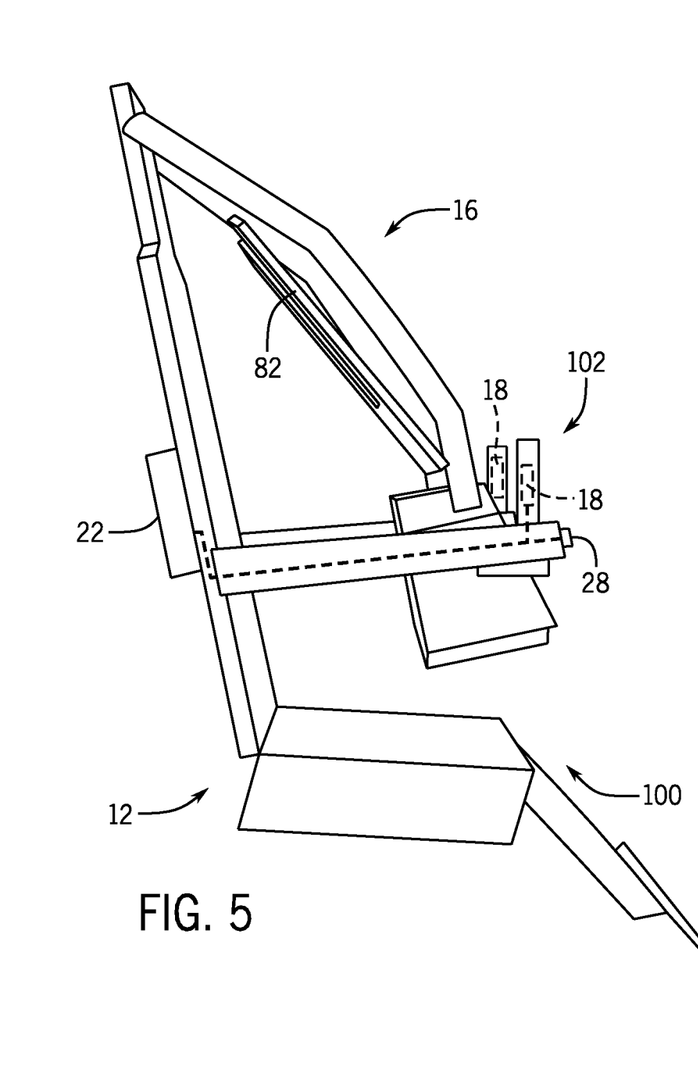
FIG. 5 is a side view of a ride vibration system, in accordance with an embodiment of the present disclosure.
Figure 6:
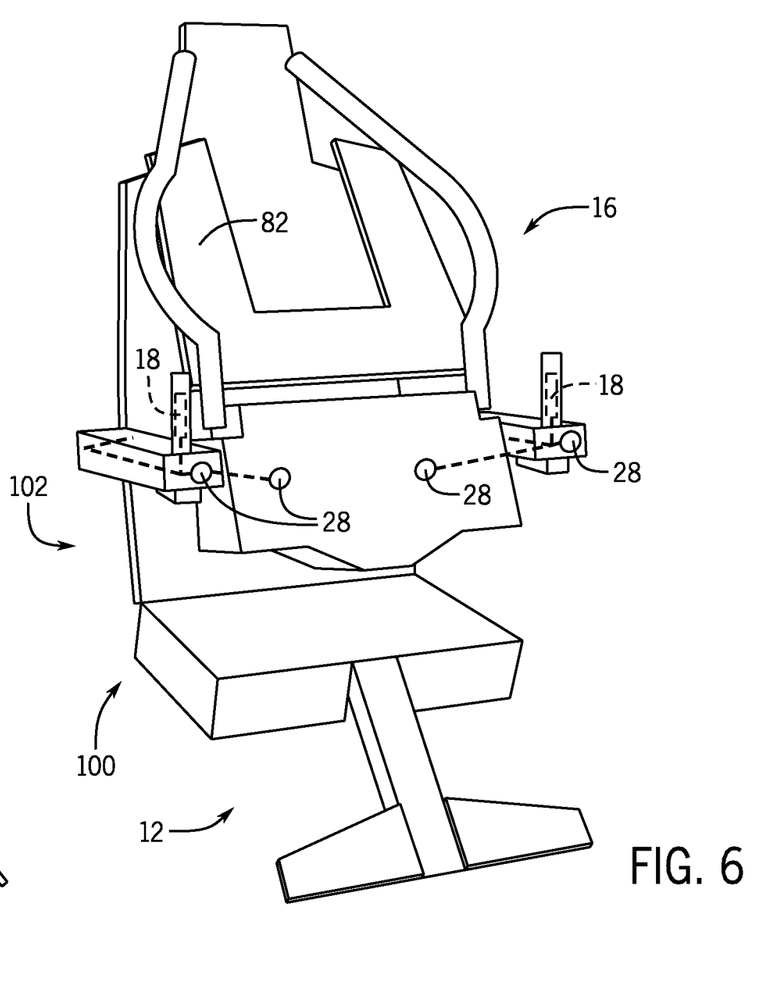
FIG. 6 is a perspective view of a ride vibration system, in accordance with an embodiment of the present disclosure.

FIGS. 5 and 6 respectively illustrate a side view and a perspective view of a ride vibration system 100 in accordance with present embodiments. As illustrated, the ride vibration system 100 may include handles 102 with vibrators 18. As illustrated, the handles 102 do not form part of the restraint system 16 (e.g., chest restraint 82). However, the handles 102 are positioned so that the rider may grab the handles 102 if a more intense experience is desired. The ride vibration system 100 is similar to that of the vibration systems discussed above, wherein the vibratory experience may be similarly controlled with one or more buttons and/or dials 28 (e.g., input devices), by grabbing the handles 102, or the like. In some embodiments, the handles 102 may have dual functions. For example, in addition to providing sensory effects when engaged by the rider, they may operate as joy sticks to guide other aspects of the ride.

Figure 7:
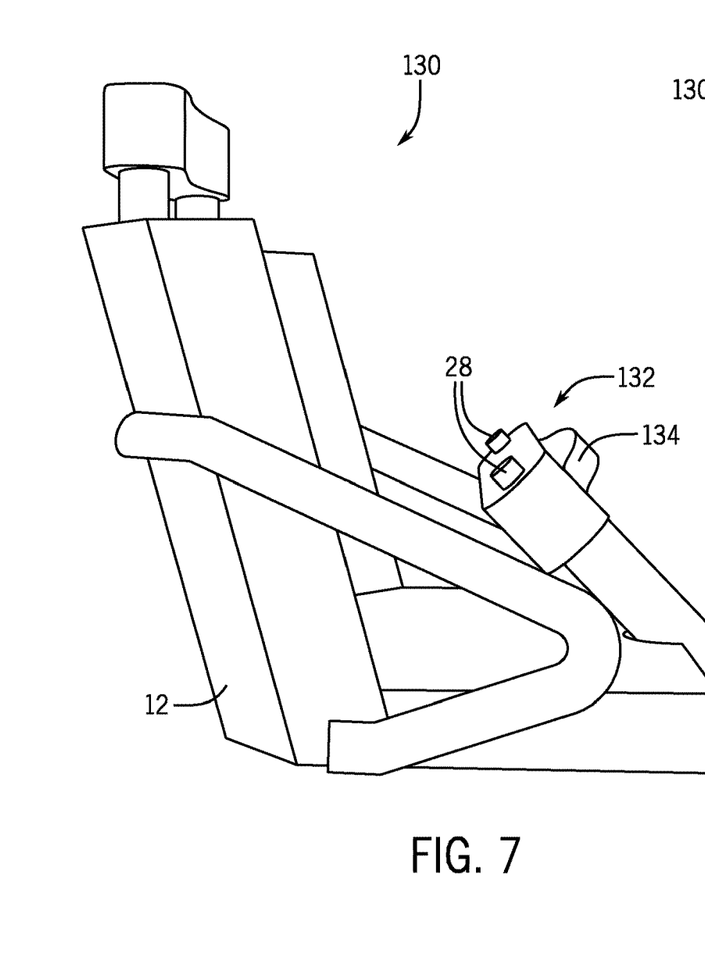
FIG. 7 is a side view of a ride vibration system, in accordance with an embodiment of the present disclosure.
Figure 8:
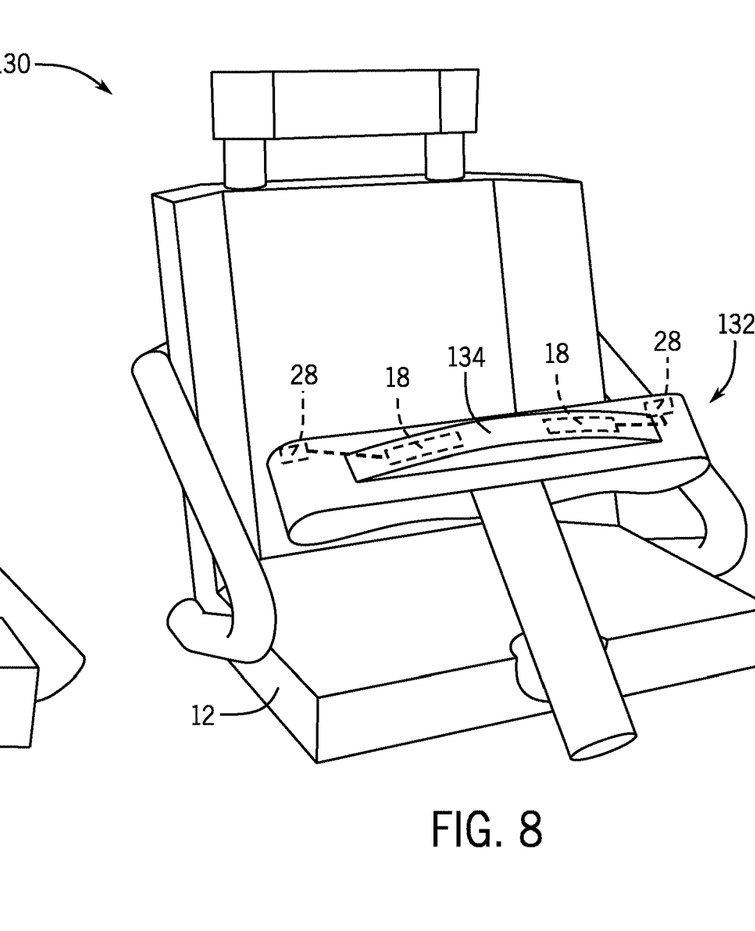
FIG. 8 is a perspective view of a ride vibration system, in accordance with an embodiment of the present disclosure.

FIGS. 7 and 8 respectively illustrate a side view and a perspective view of a ride vibration system 130 in accordance with present embodiments. The ride vibration system 130 includes a lap restraint system 132 that holds a rider in the seat 12. The lap restraint system 132 may include one or more restraint handles 134 that a rider may grab during the ride. Vibrators 18 may be placed within the restraint handles 134 of the restraint system 16. These restraint handles 134 may be grabbed by the rider 14 during the ride, enabling the vibrations generated by the vibrators 18 to be transferred through the restraint handles 134 to the rider 14. The ride vibration system 100 may be similar to that of the vibration systems discussed above, wherein the vibratory experience may be similarly controlled with one or more buttons and/or dials 28 (e.g., input devices).

Figure 9:
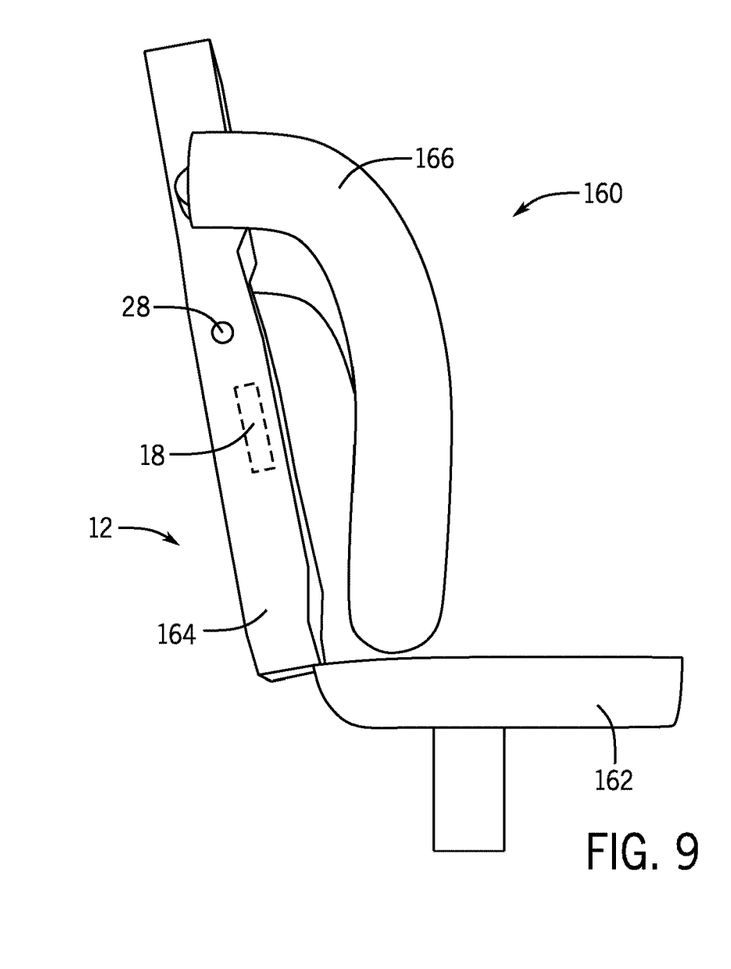
FIG. 9 is a side view of a ride vibration system, in accordance with an embodiment of the present disclosure.
Figure 10:
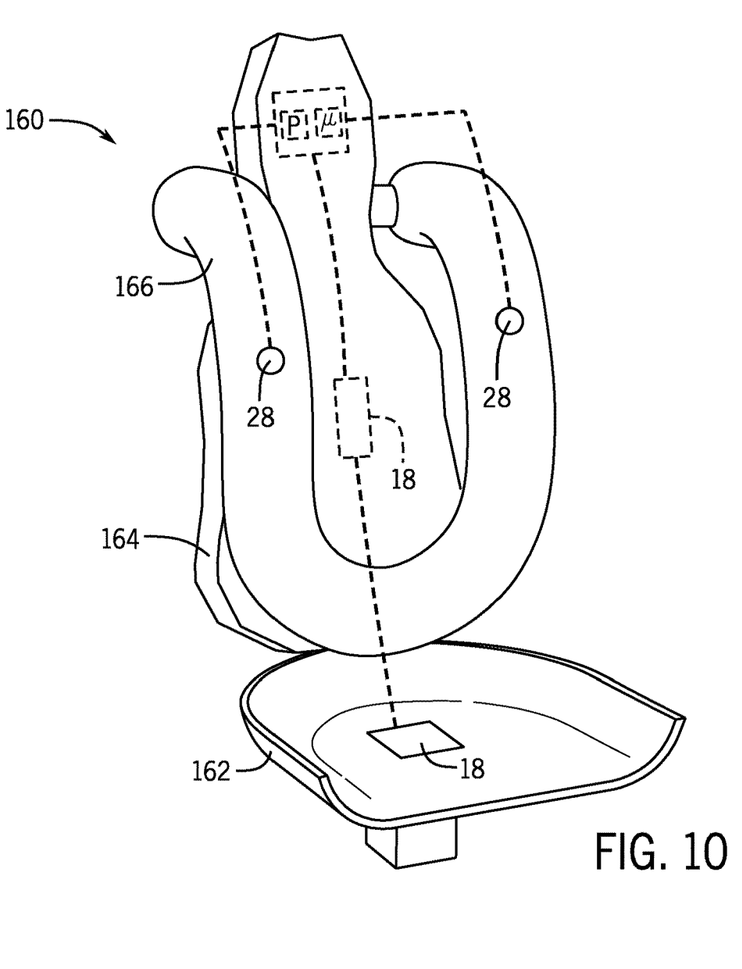
FIG. 10 is a perspective view of a ride vibration system, in accordance with an embodiment of the present disclosure.

FIGS. 9 and 10 respectively illustrate a side view and a perspective view of a ride vibration system 160. As illustrated, the ride vibration system 160 may be coupled to the seat 12. For example, the ride vibration system 160 may include one or more vibrators 18 coupled to a seat cushion 162 and/or to a back cushion 164. In some embodiments, the seat cushion 162 and/or the back cushion 164 may be made from a hard or semi-hard material to facilitate vibration transfer from the vibrators 18 to the rider. For example, the cushions 162, 164 may be made from hard foam. The vibratory experience may be similarly controlled with one or more buttons and/or dials 28. The buttons 28 may be placed on the restraint 166 and/or on the seat 12. As explained above, these buttons 28 may control the vibrational intensity of one or more vibrators 18 to customize the ride experience for the rider.

Figure 11:
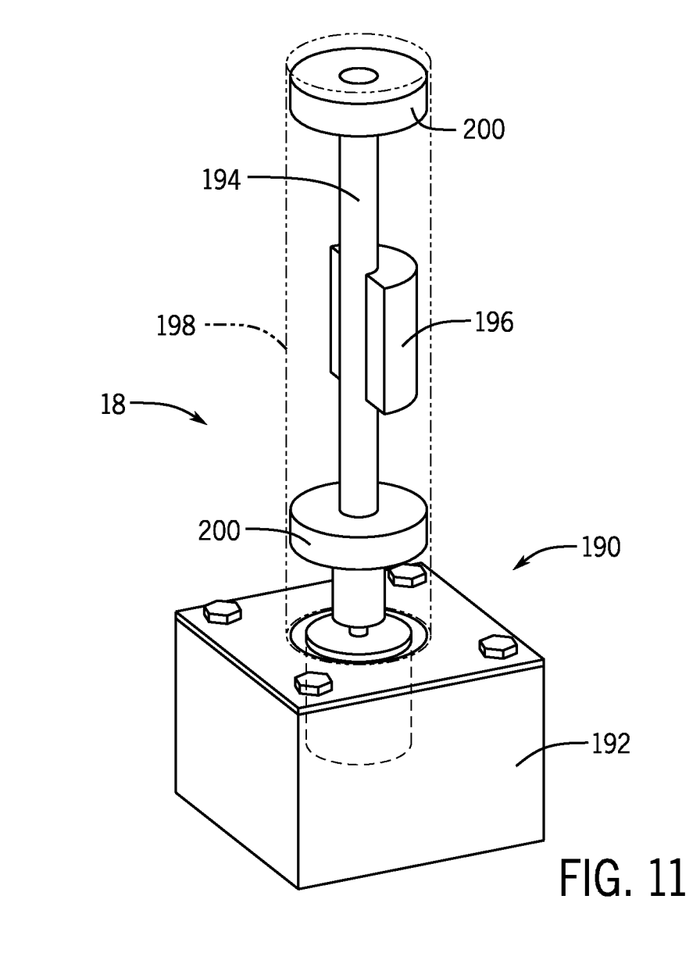
FIG. 11 is a perspective view of a vibrator, in accordance with an embodiment of the present disclosure.

FIG. 11 is a perspective view of the vibrator 18. The vibrator 18 includes a motor 190 (e.g., high frequency motor, stepper motor). The motor 190 is contained within a housing 192 (e.g., motor housing). In some embodiments, the housing 192 may include a vibration dampening material (e.g., rubber, plastic) that resists vibration transfer from the vibrator 18 into a seat and/or restraint. The motor 190 couples to a shaft 194 with an eccentric mass 196. The eccentric mass 196 unevenly distributes weight about the shaft 194, which creates vibration as the motor 190 rotates the shaft 194. These vibrations may then be transferred to a housing 198 through bearings 200. As illustrated, the bearings 200 support the shaft 194 within the housing 198 at two locations. In some embodiments, there may be a different number of bearings 200 (e.g., 1, 2, 3, or more). In some embodiments, the two locations may be on opposite sides of the eccentric mass 196. The housing 198 may be the handle on a ride (e.g., restraint handle) or a separate housing placed within the handle or other portion of a restraint system or seat. The vibrators 18 may therefore be modular, which may facilitate replacement over the lifetime of the ride.

Figure 12:
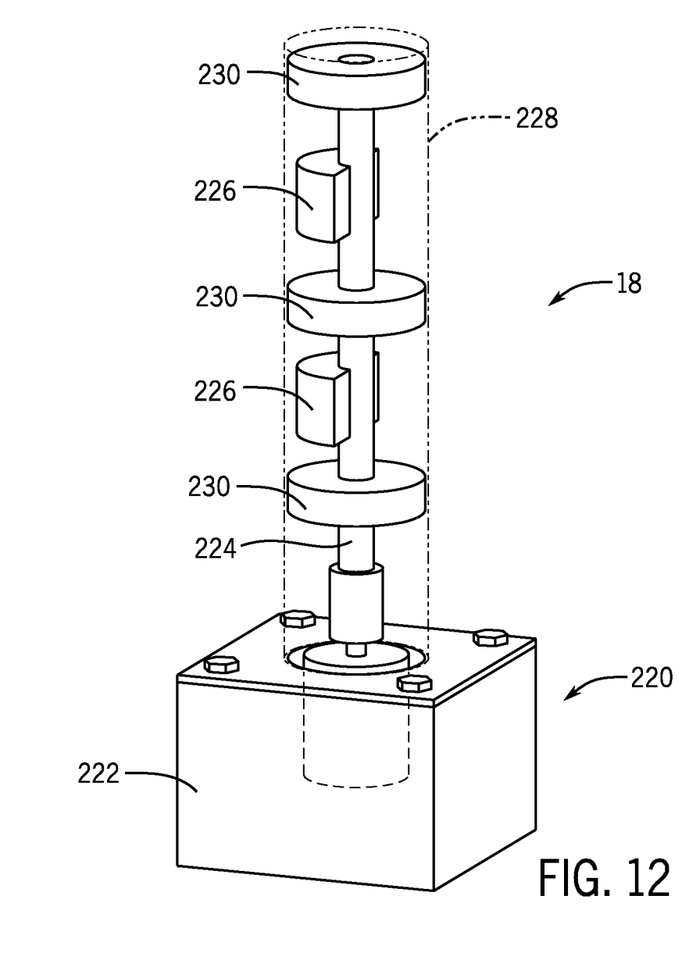
FIG. 12 is a perspective view of a vibrator, in accordance with an embodiment of the present disclosure.

FIG. 12 is a perspective view of the vibrator 18. The vibrator 18 includes a motor 220 (e.g., high frequency motor, stepper motor). The motor 220 is contained within a housing 222. In some embodiments, the housing 222 may include a vibration dampening material (e.g., rubber, plastic) that resists vibration transfer. The motor 220 couples to a shaft 224 with multiple eccentric masses 226 (e.g., 2, 3, 4, or more). The eccentric masses 226 unevenly distributes weight about the shaft 224, which creates vibration as the motor 220 rotates the shaft 224. These vibrations may then be transferred to a housing 228 through bearings 230. As illustrated, the bearings 230 support the shaft 224 within the housing 228 to block contact between the shaft 224 and the housing 228. The vibrator 18 may include multiple bearings 230 (e.g., 1, 2, 3, 4, 5, or more). For example, a pair of bearings 203 may be placed on opposite sides of each eccentric mass 226 along the longitudinal axis of the shaft 224. The housing 228 may be placed in the handle on a ride (e.g., restraint handle) or a separate housing placed within the handle or other portion of a restraint system or seat.

Figure 13:
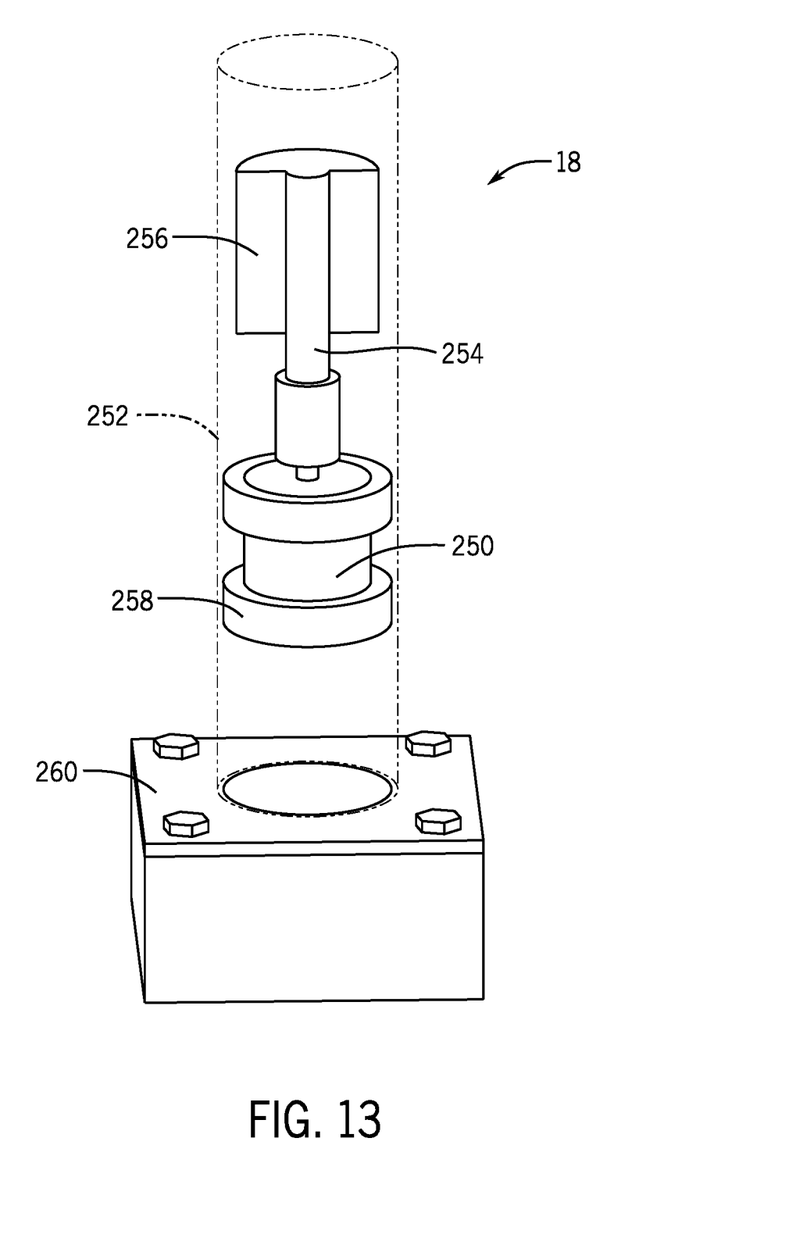
FIG. 13 is a perspective view of a vibrator, in accordance with an embodiment of the present disclosure.

FIG. 13 is a perspective view of the vibrator 18 with different features relative to the previously illustrated embodiments. The vibrator 18 includes a motor 250 (e.g., high frequency motor, stepper motor). The motor 250 is contained within a housing 252. The housing 252 may be the handle on a ride (e.g., restraint handle) or a separate housing placed within the handle or other portion of a restraint system or seat. The motor 250 couples to a shaft 254 with an eccentric mass 256. The eccentric mass 256 unevenly distributes weight about the shaft 254, which vibrates the shaft 254 as the motor 250 rotates the shaft 254. These vibrations may then be transferred to a housing 252 through one or more connectors 258, such as annular rings that couple to the motor 250 and to the housing 252. The housing 252 may couple to a mounting plate 260 that enables the vibrator 18 to couple to a ride. In some embodiments, the mounting plate 260 may be made out of or include a layer of vibration dampening material (e.g., rubber, plastic) that resists vibration transfer to a restraint system and/or a seat.

Present embodiments address a need for variability in haptic effects that can be efficiently presented for entertainment purposes during an amusement park ride. As discussed above, technical effects of the present embodiments include the ability to select certain thrill levels or intensity levels that are implemented through controlled vibration levels. It should be understood that other effects may also be controlled in conjunction with these haptic effects. For example, lighting on the ride vehicle or along the ride path may be adjusted in conjunction with the vibrational effects. Likewise, other sensory-based activity (e.g., audio presentation, video display, olfactory emission) may be coordinated with selected vibrational levels. As a result of implementing embodiments in accordance with the present techniques, the appeal of an amusement park ride can be multiplied. Indeed, a single ride system may appeal to numerous age groups and riders with varying thrill level interests.

Further, technical effects in accordance with present embodiments include efficient and intuitive selection of thrill levels. For example, selection of a thrill level may be required as part of engaging with the ride vehicle and mistaken adjustment may be avoided by blocking thrill level selection activities after the ride has started. However, in some embodiments, thrill level selection can be made throughout a course of the ride. Also, efficient and intuitive thrill level selection may be facilitated by simply grabbing a handle with appropriate labeling or a portion of a handle with appropriate labeling. Thus, not only is the ride more appealing to a larger set of amusement park guests because of the options but because the options are easily identified and selectable.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride vibration system, comprising:
    a rider support feature coupled to a ride vehicle and accessible to a rider positioned in the ride vehicle;
    a vibrator comprising a motor configured to rotate an eccentric mass to generate vibrations, wherein the vibrator is at least partially integrated with the rider support feature and is configured to transfer the vibrations to the rider support feature;
    an input device comprising a first touch-sensitive sensor disposed on a first handle portion of a handle and a second touch-sensitive sensor disposed on a second handle portion of the handle, wherein the input device is configured to receive a vibration intensity selection and the vibrator is configured to activate in response to the rider contacting the first handle portion of the handle; and
    a controller coupled to the vibrator and to the input device, wherein the controller is configured to receive the vibration intensity selection and to control the motor to control an intensity of the vibrations.

2. The ride vibration system of claim 1, wherein the input device comprises a button, a dial, or a combination thereof.

3. The ride vibration system of claim 1, wherein the vibrator is positioned within the handle.

4. The ride vibration system of claim 1, wherein the rider support feature comprises a seat and the vibrator is partially integrated with the seat via a coupling.

5. The ride vibration system of claim 1, wherein the rider support feature comprises a lap restraint system.

6. The ride vibration system of claim 1, comprising an additional vibrator, wherein the vibrator and the additional vibrator are configured to respectively generate high-frequency vibrations at a first intensity and a second intensity, and wherein the first intensity and the second intensity are different.

7. The ride vibration system of claim 6, wherein the additional vibrator is configured to activate in response to the rider contacting the second portion of the handle.

8. The ride vibration system of claim 6, comprising a second handle comprising a third touch-sensitive sensor on the second handle, wherein the vibrator is configured to activate in response to the rider contacting a first input device positioned on the handle, and the additional vibrator is configured to activate in response to the rider contacting a second input device positioned on the second handle.

9. The ride vibration system of claim 1, wherein the controller is configured to adjust the vibration intensity selection from a first vibration level to a second vibration level, wherein the first vibration level and the second vibration level are greater than a vibration level in a completely off state.

10. A ride vibration system, comprising:
    a restraint system configured to restrain a rider in a seat of a ride vehicle;
    a vibrator configured to generate vibrations and transmit the vibrations to the restraint system;
    an input device comprising a first touch-sensitive sensor disposed on a first handle portion of a handle and a second touch-sensitive sensor disposed on a second handle portion of the handle, wherein the input device is configured to receive a vibration intensity selection and the vibrator is configured to activate in response to the rider contacting the first handle portion of the handle or the second handle portion of the handle; and
    a controller coupled to the vibrator and to the input device, wherein the controller is configured to receive the vibration intensity selection and to control an intensity of the vibrations.

11. The ride vibration system of claim 10, wherein the vibrator comprises a high-frequency motor configured to rotate an eccentric mass to generate the vibrations at high-frequency.

12. The ride vibration system of claim 10, wherein the vibrator is coupled to the handle.

13. The ride vibration system of claim 12, wherein the restraint system comprises the handle.

14. The ride vibration system of claim 10, wherein the input device comprises a button, a dial, or a combination thereof.

15. A ride vibrator, comprising
    a shaft;
    an eccentric mass coupled to the shaft, wherein the eccentric mass is configured to vibrate the shaft in response to rotation of the shaft;
    a vibrator housing configured to receive the shaft and the eccentric mass, wherein the vibrator housing is configured to couple to a ride vehicle;
    a bearing coupled to the shaft, wherein the bearing is configured to transfer shaft vibrations to the vibrator housing;
    a motor coupled to the shaft and configured to rotate the shaft; and
    an input device comprising a first touch-sensitive sensor disposed on a first handle portion of a handle and a second touch-sensitive sensor disposed on a second handle portion of the handle, wherein the input device is configured to couple to the motor, wherein the input device is configured to receive a selection of a change to a rotational speed of the motor to control vibration of the vibrator in response to a rider contacting the first handle portion of the handle or the second handle portion of the handle.

16. The ride vibrator of claim 15, comprising a plurality of eccentric masses coupled to the shaft at different positions along a longitudinal axis of the shaft, wherein the eccentric mass is one of the plurality of eccentric masses.

17. The ride vibrator of claim 16, comprising a plurality of bearings, wherein the bearing is one of the plurality of bearings and wherein the plurality of bearings is configured to separate the plurality of eccentric masses from each other along the longitudinal axis of the shaft.

18. The ride vibrator of claim 15, wherein the input device is accessible to the rider when the rider is secured within a riding area of the ride vehicle.

19. The ride vibrator of claim 15, comprising a motor housing configured to house the motor, wherein the motor housing couples to the vibrator housing, and wherein the motor housing comprises a dampening material configured to block or reduce the transfer of vibrations from the shaft through the motor housing.

20. The ride vibrator of claim 16, wherein each eccentric mass of the plurality of eccentric masses generates a different vibration frequency.

\* \* \* \* \*